Patented Aug. 8, 1944

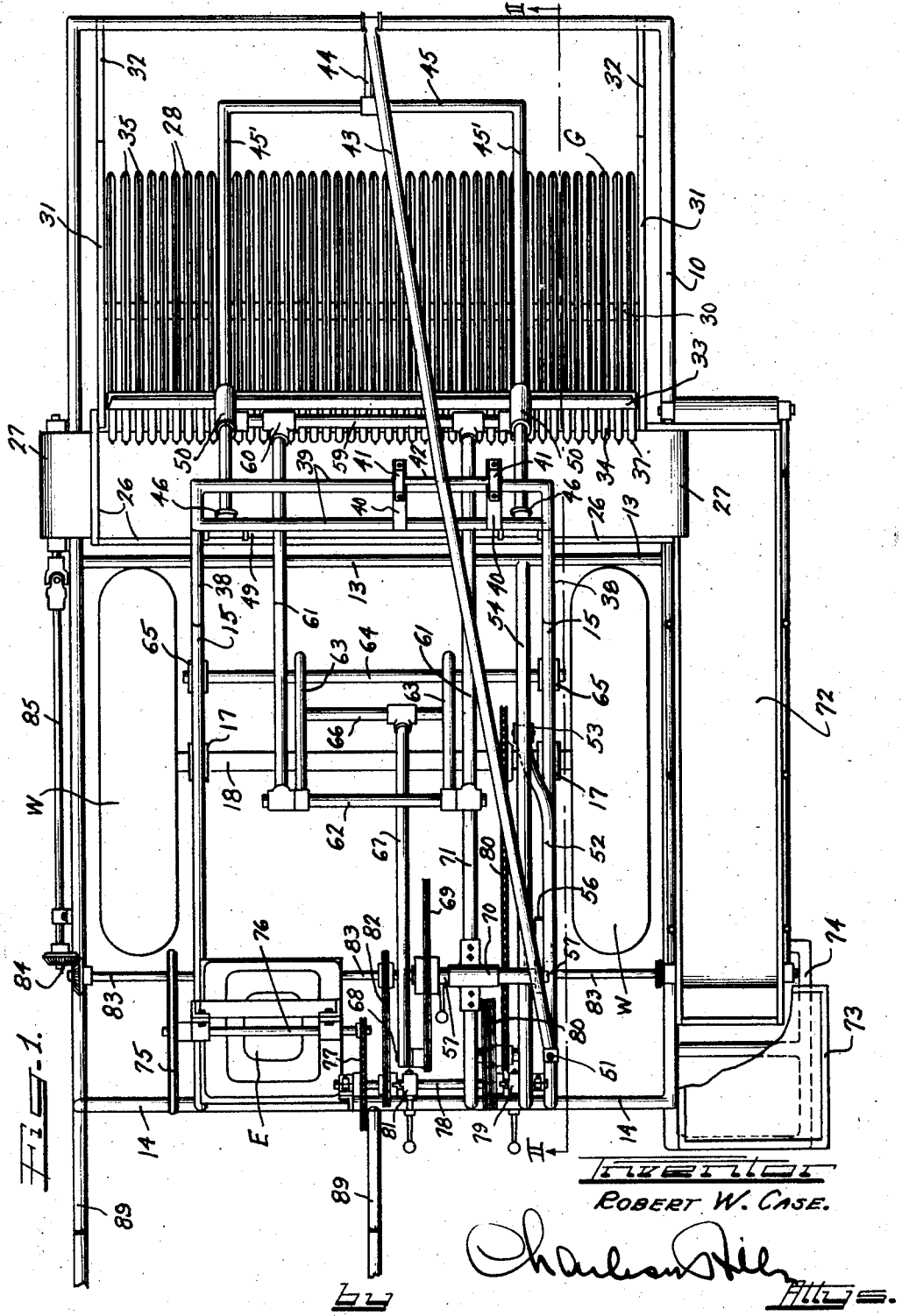

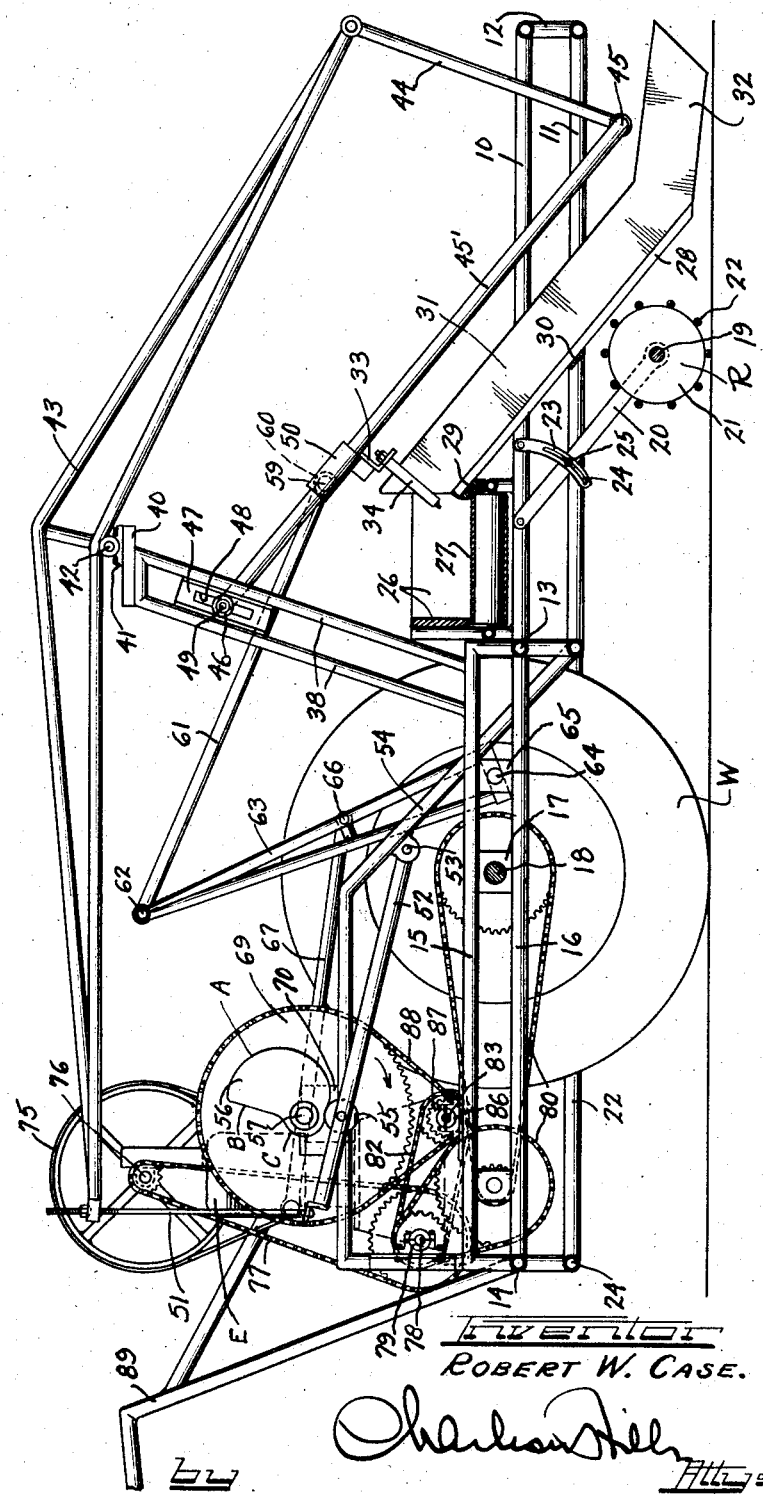

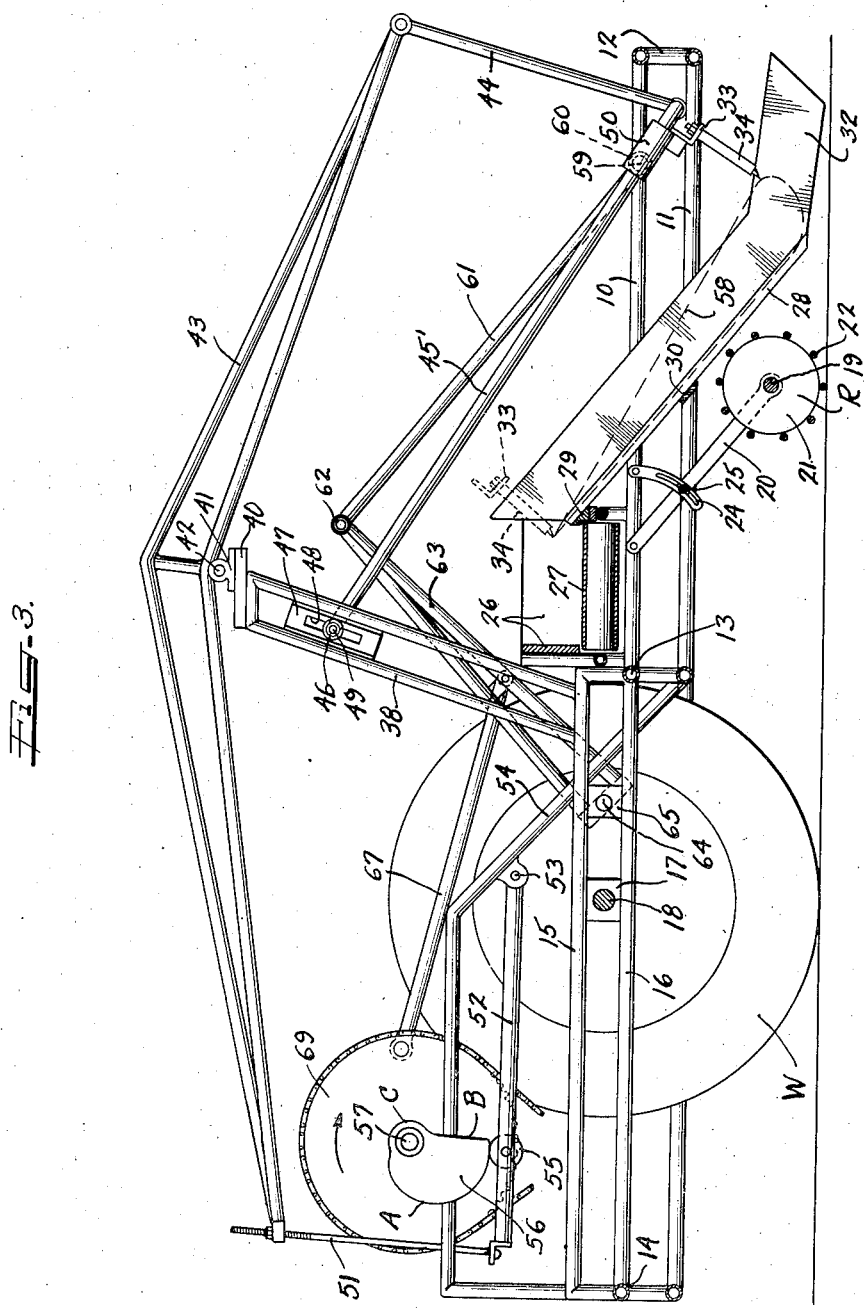
Aug. 8, 1944.　　　R. W. CASE　　　2,355,273
BERRY PICKING MACHINE
Filed July 8, 1943　　　4 Sheets-Sheet 3
Inventor
ROBERT W. CASE.

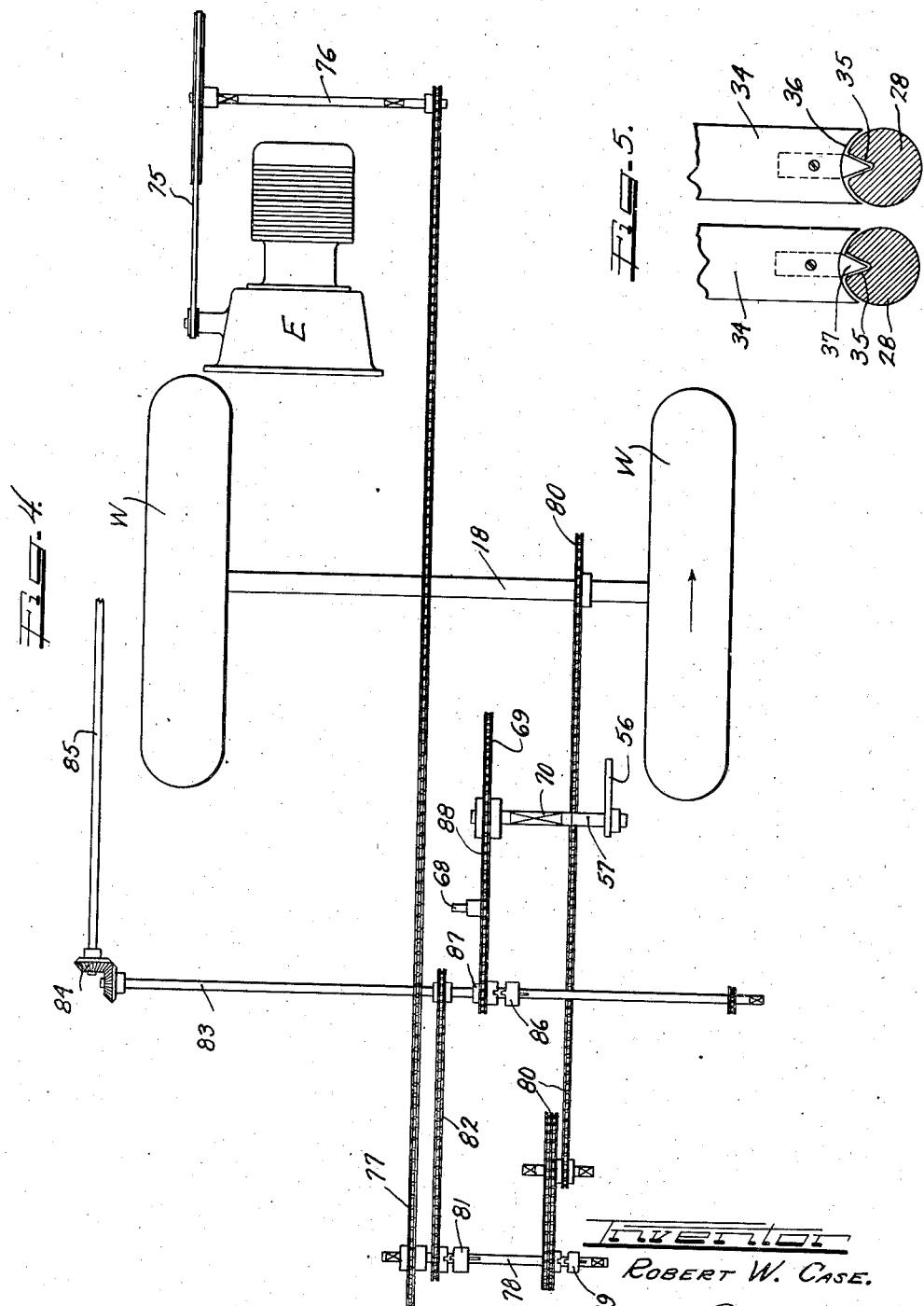

2,355,273

UNITED STATES PATENT OFFICE 2,355,273

BERRYPICKING MACHINE

Robert W. Case, Warrens, Wis.

Application July 8, 1943, Serial No. 493,844

6 Claims. (Cl. 56—330)

My invention relates to picking machines, particularly adaptable for picking berries such as cranberries.

An important object of the invention is to provide a power-propelled and power-operated berry picking machine with conveyor means thereon for delivering the picked berries to receptacles.

Another important object is to provide in a machine of this type, a gathering structure in the form of a plurality of stationary parallel bars extending longitudinally of the machine at the front thereof in an inclined plane with their lower ends at the proper height above the ground for receiving between them the shrub tendrils with the berries thereon, together with a rake element operable to move the ends of its teeth along the top of the bars to assist the bars in stripping the berries and moving them to the conveyor mechanism.

Another important object is to provide improved means for moving the rake element through an orbit for successive engagement of its teeth for travel along the tops of the gathering bars.

My invention also embodies other features of construction and operation for producing an efficient machine for the purpose referred to.

The various features of my invention are embodied in the structure shown on the drawings, in which Figure 1 is a plan view of the machine;

Figure 2 is a section on plane II—II of Figure 1 showing the rake element at the end of a raking operation;

Figure 3 is a section like Figure 2 but showing the rake element about to have the ends of its teeth applied to the front ends of the receiving bars;

Figure 4 is a more or less diagrammatic plan view showing the driving connections to the various operating parts from a driving source such as an internal combustion engine; and Figure 5 is an enlarged view showing the guide connection between the rake element teeth and the gathering bars for keeping the rake teeth in alignment with the bars during the raking operation.

The supporting structure for the machine comprises the upper and lower rectangular frames 10 and 11 connected by cross-braces 12. In front of the wheels W, the sides of the upper frame 10 are connected by a cross-bar 13 and between this cross-bar and the rear end bar 14 of the frame 10 extend the upper and lower bars 15 and 16 between which are supported the journal boxes 17 for the axle 18 for the wheel W.

In front of the wheel W is a roller R. This shaft 19 for this roller is journaled in the ends of arms 20 pivoted at their upper ends to the sides of the frame 10. The roller may comprise two end disks 21 connected together by rods 22 secured in spaced relation to the peripheries of the disks. In order to adjust the roller vertically for setting of the front end of the machine, links 23 may be provided pivoted to the top frame 10 and having slots 24 for receiving bolts 25 extending through the arms 20.

Extending transversely in front of the wheels and mounted on the frame 10 is a conveyor housing 26 for a conveyor belt 27, the front side of the housing being open. In front of the conveyor is the comb-shaped receiving or gathering element G comprising the parallel bars or teeth 28 secured at their inner ends to a cross-bar 29 mounted on the frame 10, the structure being inclined downwardly with its outer end close to the ground. A spacer bar 30 is secured to the bars intermediate their ends to assist in holding them properly spaced apart, the spacing distance being less than the average diameter of the berries which are to be picked. The comb structure G is flanked at its ends by side boards 31 the outer portions 32 of which extend a distance forwardly of the outer ends of the teeth 28 and are deflected upwardly to terminate close to the ground. With this arrangement, as the machine travels forwardly, the berry bearing straws or tendrils of the cranberry bushes are gathered up between the ends 32 of the side boards and by the teeth 28 for passage through the spaces between the teeth for stripping of the berries therefrom by the teeth.

Describing now the rake mechanism for assisting the teeth 28 in stripping the berries and conveying the stripped berries to the conveyor 27, a rake structure comprises the bar 33 with teeth 34 extending therefrom the spacing between which is the same as the spacing between the teeth 28 of the gathering member G. As best shown on Figure 5, the teeth or bars 28 have guide grooves 35 extending longitudinally in the upper sides thereof, the lower ends of the rake teeth 34 having concave end surfaces 36 for engaging the bars 28 which are cylindrical, and the rake teeth having guide pins 37 for engaging in the guide channels 35, so that as the rake element teeth are carried along the bars 28 they will be held in proper alignment therewith.

Extending upwardly from the front end of each of the bars 15 of the machine supporting frame is a pair of parallel bars 38, these pairs of bars being connected at their upper ends by a pair of cross-bars 39 which are connected by cross-bars 40 mounting bearings 41 for a fulcrum shaft 42. Secured to this fulcrum shaft is a walking beam structure 43 connected at its forward end to a link 44 with the yoke of a U frame 45 whose legs 45' terminate at their ends in fittings 46 for fulcrum attachment with the supports 47 on the bars 38. The supports 47 have slots 48 for receiving the fulcrum bolts 49 extending through the fittings 46 so that the fulcrum points may be adjusted. The legs 45' of the U frame receive sleeves 50 to which the rake bar 33 is secured so that the rake structure is mounted for longitudinal movement along the legs 45'.

At its rear end the walking beam 43 is connected by an adjustable link 51 with the end of a cam lever 52 fulcrumed at 53 on a rigid bar 54 forming part of the machine supporting framework. This cam lever carries a cam roller 55 for engagement by a cam 56 on the shaft 57. As this cam rotates, the cam lever will effect rocking motion of the walking beam for vertical swing of the U frame 45 to hold the legs 45' of the U frame parallel with the gathering teeth or bar 28 when the rake teeth travel inwardly along the bars (Figure 2), and to swing the yoke frame up to hold the rake teeth ends above the bars when the rake structure is being shifted outwardly preparatory to another raking operation, the path of the rake teeth ends being indicated by the dotted line 58 on Figure 3.

The rake structure supporting sleeves 50 are cross connected by a shaft 59 journaled in the sleeves and supporting fittings 60 from which arms 61 extend and receive at their ends a cross shaft 62 which is supported at the upper ends of an oscillating frame 63 which is secured at its lower ends to a shaft 64 which is journaled at its ends in journal boxes 65 mounted between the bars 15 and 16 of the machine supporting frame structure. A cross-bar 66 intermediate the ends of the frame 63 fulcrums the end of a connecting rod 67 engaging at its outer end a crank pin 68 on the sprocket wheel 69 which is secured on the shaft 57 on which the cam 56 is mounted, the shaft 57 being journaled in a bearing structure 70 supported on a bar 71 forming part of the machine supporting framework. With the arrangement shown, when the wheel 69 rotates in the direction of the arrow indicated thereon, the cam 56 cooperating with the cam roller 55 will cause rocking of the walking beam 43, and the cam pin 68 connected by the rod 67 with the frame 63 will oscillate this frame for movement of the sleeves 50 on the U frame legs 45' for reciprocation of the rake structure. Figure 2 shows the various parts of the machine in position just after the rake structure has shifted the ends of the rake teeth along the bars 28 of the gathering structure for deposit of the stripped berries into the conveyor 27. Now as the shaft 57 rotates, the cam 56 will engage its eccentric surface A with the cam roller 55 for rocking of the beam 43 in counterclockwise direction to swing the U frame 45 upwardly with its legs 45' inclined to the gathering bars 28, while at the same time the cam pin 68 effects the rocking of the frame 63 for outward shift of the rake structure on the inclined legs 45' so that the points of the rake teeth will clear the bars 28 for travel through the orbit indicated by the line 58 on Figure 3. Near the end of 180° rotation of the wheel 69, the end of the cam surface A will reach the cam roller 55 and the rake structure will be at the outer ends of the legs 45' of the U frame but with the rake structure elevated, as shown on Figure 3. Now when the cam surface A leaves the cam roller, the roller will come into engagement with the substantially radially extending cam surface B and the beam 43 will rapidly rotate in clockwise direction to bring the bars 45' back into parallelism with the gathering bars 28 and the points of the rake teeth into engagement with the outer ends of the channels 35 in the gathering bars 28. The cam roller 55 will now come into engagement with the concentric portion C of the cam after substantially 180° rotation of the wheel 69 which brought the rake structure to its outer position. Now, during the return 180° rotation of the wheel 69 with the cam roller in engagement with the surface C of the cam, the legs 45' of the U frame will remain parallel with the gathering bars 28 while the frame 63 is rocked in counterclockwise direction to draw the rake structure along the legs 45' and with the points of the rake teeth engaging in and traveling through the channels 35 in the gathering bars 28. As the machine travels forwardly, the berry supporting tendrils of the cranberry shrubs will be received in the spaces between the gathering bars 28 and some of the berries will be stripped therefrom by the gathering bars, and as the rake teeth are then carried along the bars other berries will be stripped from the shrub tendrils and the picked berries will then be moved by the rake teeth upwardly along the gathering bars 28 for deposit onto the conveyor belt 27. Thus, the rake structure is repeatedly shifted along the gathering bars 28 for stripping of the berries from the shrubs and deposit onto the conveyor 27. This conveyor 27 carries the berries onto a conveyor 72 supported from the machine framework at one side thereof for discharge of the berries into containers 73 placed on a platform 74 extending from the machine supporting framework.

From Figure 1 and the diagrammatic arrangement on Figure 4, the drive for the various operating parts will be understood. The driving source may be an internal combustion engine E. The crank shaft of the engine is connected by sprocket wheel and chain connection 75 with a shaft 76 which, through sprocket wheel and chain connection 77, drives the shaft 78. By means of a clutch collar 79, the shaft 78 may be connected by a sprocket wheel and chain driving train 80 with the axle 18 for drive of the propelling wheels W of the machine. By another clutch collar 81, the shaft 78 may be connected by connection 82 for drive of a shaft 83 which at one end connects through gearing 84 and shaft 85 with the conveyor 27, the shaft 83 at its other end being connected with the conveyor 72 for drive thereof. On the shaft 83 is a clutch collar 86 for clutching the sprocket gear 87 to the shaft, this gear being connected by driving chain 88 with the sprocket wheel 69 on the shaft 68 above the shaft 83.

Suitable handles 89 are provided by which the operator may guide the machine while it is being propelled by the wheels W. By adjusting the roller R, the ends of the bars 28 and the ends 32 of the side walls of the gathering structure will be held the proper distance from the ground for the most efficient gathering and receiving of the bush tendrils from which the berries are to be stripped. As the machine travels forwardly, the rake structure travels repeatedly through its orbit for passageway of its teeth along the tops of the gathering bars for the stripping operation and delivery of the picked berries into the conveyor 27, and to the conveyor 72 for final delivery into containers 73.

The pins or points 37 on the rake teeth serve also to keep the bars clean and free of tendrils or vines which may tend to wrap around them. As the machine is operated, the pins or points engage behind any wrapped or clinging tendrils or vines and pull them loose and away from the bars to leave the bars clean for efficient operation.

I have thus produced a very efficient and economically constructed machine for picking berries, such as cranberries. I do not, however, desire to be limited to the exact construction, arrangement and operation shown and described, as changes and modifications may be made without departing from the scope of my invention.

I claim as follows:

1. A berry picking machine comprising a supporting frame, a berry gathering structure comprising a row of parallel spaced apart gathering bars arranged in a plane inclined downwardly from the machine toward the ground for receiving the tendrils of berry bushes below the berries thereon as the machine travels, a guide frame above said gathering bars, a rake bar slidable on said guide frame and having teeth depending therefrom in the planes of said gathering bars, a driving source on said supporting frame, an operating connection between said driving source and said rake bar for moving said rake bar inwardly and outwardly along said guide frame, and another operating connection between said source and said guide frame adapted to hold said guide frame parallel with said gathering bars when said rake bar is moved inwardly on said guide frame for cooperation of the rake teeth with the gathering bars to strip berries from the bushes and to move said guide frame upwardly for withdrawal of the rake teeth from the gathering bars when said rake bar is moved outwardly on said guide frame.

2. A machine for the purpose described comprising a supporting frame, a gathering structure stationarily mounted at the front of said supporting frame and comprising a row of parallel spaced apart gathering bars inclined downwardly toward the ground for receiving the tendrils of berry bushes from which the berries are to be stripped, a guide frame over said gathering structure pivoted at its inner end on said supporting frame, a rake bar on said guide frame having teeth depending therefrom in alignment with the gathering bars, a driving source on said supporting frame, an operating connection between said driving source and said rake bar for shifting said rake bar inwardly and outwardly along said guide frame, and another operating connection between said source and said guide frame functioning to swing said guide frame down for cooperation of the rake teeth with the gathering bars to strip berries from the bushes when said rake bar is moved inwardly along said guide frame and to swing said guide frame upwardly to withdraw the rake teeth from the gathering bars when said rake bar is shifted outwardly on said guide frame.

3. A machine for the purpose described comprising a supporting frame, a gathering structure stationarily mounted at the front of said supporting frame and comprising a row of parallel spaced apart gathering bars inclined downwardly toward the ground for receiving the tendrils of berry bushes to be stripped, a guide frame movably mounted on said supporting frame above said gathering structure, a rake structure slidable inwardly and outwardly along said guide frame and having rake teeth depending therefrom in the planes of the gathering bars, a driving source on said supporting frame, an operating connection between said driving source and said rake structure for shifting said rake structure on said guide frame, and another operating connection between said driving source and said guide frame functioning to move said guide frame for travel of said rake teeth against and along the tops of said gathering bars while said rake structure is being shifted inwardly on said guide frame and for raising said guide frame for withdrawal of the rake teeth from the gathering bars when the rake structure is being shifted outwardly on the guide frame.

4. A machine for the purpose described comprising a supporting frame, a row of parallel spaced apart gathering bars arranged in a plane inclined downwardly from the machine toward the ground for receiving the tendrils of bushes to be picked, a guide frame pivoted at its inner end on said supporting frame to extend above said gathering bars, a rake bar mounted on said guide frame and having rake teeth depending therefrom in alignment with the gathering bars, a walking beam fulcrumed on said supporting frame and connected with the outer end of said guide frame, a driving source on said supporting frame, an operating connection between said driving source and said rake bar for shifting said rake bar inwardly and outwardly along said guide frame, and another operating connection between said driving source and said walking beam functioning to move said beam for swing of said guide frame downwardly into parallelism with said gathering bars for cooperation of the rake teeth with the gathering bars to strip berries from the bushes when said rake bar is shifted inwardly along the guide frame and to swing said guide frame upwardly to withdraw the rake teeth from the gathering bars when said rake bar is being shifted outwardly on said guide frame.

5. A machine for the purpose described comprising a supporting frame mounted to be moved over the ground, gathering bars at the front of said frame arranged in a plane inclined downwardly toward the ground, a guide frame above said gathering bars hinged at its inner end on said supporting frame, a rake bar mounted on said guide frame for reciprocation thereon and having teeth depending therefrom in alignment with the gathering bars, a walking beam fulcrumed on said supporting frame and linked at its outer end to the outer end of said guide frame, a driving source mounted on said supporting frame, a driving connection between said driving source and said rake bar for reciprocation of said rake bar on said guide frame, and another driving connection between said driving source and the rear end of said walking beam including cam means whereby said walking beam will be operated to hold said guide frame in position for cooperation of the rake teeth with the gathering bars for stripping berries from bushes while said rake bar is being shifted inwardly on said guide frame and to swing and hold said guide frame upwardly for withdrawal of the rake teeth from the gathering bars while said rake bar is being shifted outwardly on said guide frame.

6. In a machine for the purpose described, a supporting frame, a row of parallel spaced apart gathering bars at the front of the supporting frame inclined downwardly toward the ground for receiving the tendrils of berry bushes to be picked, a guide frame movably mounted on said supporting frame above said gathering bars, a rake structure shiftable inwardly and outwardly along said guide frame and having teeth depending therefrom in the plane of the gathering bars, operating means on said supporting frame controlling the shifting of said rake bar, other operating means on said supporting frame functioning to hold said guide frame in position during inward movement thereon of said rake bar by its operating structure for movement of the rake teeth along the tops of the gathering bars and to raise said guide frame for withdrawal of the rake teeth from the gathering bars when said rake bar is being shifted outwardly, said gathering bars having longitudinally extending grooves in their upper sides and said rake teeth having projections for engaging in said grooves when said teeth move inwardly along the tops of the gathering bars whereby said teeth will be held in alignment with said gathering bars and any tendrils clinging to or wrapped around the gathering bars will be pulled loose.

ROBERT W. CASE.